United States Patent [19]

Renard

[11] Patent Number: 5,788,334
[45] Date of Patent: Aug. 4, 1998

[54] UTILITY VEHICLE WHEEL WITH VALVE EMERGING ON THE OUTSIDE OF THE DISK

[75] Inventor: Etienne Renard, Riom, France

[73] Assignee: Compagnie Générale des Etablissements Michelin-Michelin & Cie, Clermont-Ferrand Cedex, France

[21] Appl. No.: 678,943

[22] Filed: Jul. 11, 1996

[30] Foreign Application Priority Data

Jul. 25, 1995 [FR] France ................... 95 09272
Jan. 29, 1996 [FR] France ................... 96 01203

[51] Int. Cl.⁶ ............................................. B60B 19/00
[52] U.S. Cl. ............................... 301/5.24; 301/63.1
[58] Field of Search ........................... 301/5.24, 13.2, 301/36.1, 63.1, 95, 96, 97, 98; 152/415, 427, 428, DIG. 13

[56] References Cited

U.S. PATENT DOCUMENTS

| | | | |
|---|---|---|---|
| 2,054,965 | 9/1936 | Clo | 152/427 |
| 2,765,835 | 10/1956 | Pavkov | 152/427 |
| 3,102,608 | 9/1963 | Isbell et al. | 301/63.1 X |
| 3,683,479 | 8/1972 | Lejeune | 301/63.1 X |
| 3,874,736 | 4/1975 | Anderson et al. | 301/63.1 |
| 4,106,172 | 8/1978 | Bache | 301/63.1 X |
| 4,453,776 | 6/1984 | Rohr | 301/5.24 |
| 4,504,095 | 3/1985 | Edwards et al. | 301/63.1 |
| 4,513,803 | 4/1985 | Reese | 152/427 |
| 5,219,441 | 6/1993 | Utykanski et al. | 301/63.1 |

FOREIGN PATENT DOCUMENTS

| | | |
|---|---|---|
| 0067247 | 12/1982 | European Pat. Off. |
| 2314838 | 1/1977 | France |
| 4014480 | 11/1990 | Germany |
| 29506449 | 6/1995 | Germany |

OTHER PUBLICATIONS

Sonderdruck aus Automobil–Industrie Vogel–Verlag Wurzburg, 20. Jahrgang, Heft4/Nov. 1975, Räder mit Steilsschulterfelgen, Überreicht durch Kronprinz Aktiengellschaft, Solingen, by Wolsdorf, Herbst and Luders, pp. 1–12.

Primary Examiner—Russell D. Stormer
Attorney, Agent, or Firm—Baker & Botts, L.L.P.

[57] ABSTRACT

A wheel for utility vehicle, comprising a disk, a rim with a circumferential mounting groove between two bead seats and two flanges, the connection between said disk and said rim being made in a connecting region situated between the flank of the groove and the end of the seat which lie axially on the disk side, and a valve passing through said rim via a valve hole, such that said valve hole lies axially between said connecting region and said end of the seat which seat lies on the disk side, and such that if $Ø_g$ is the diameter of the radially interior surface of said mounting groove, $Ø_c$ is the diameter of the radially interior surface of the disk/rim connecting region, this diameter being taken axially at the end of the disk of the wheel, and $Ø_s$ is the diameter of the radially interior surface of the bead seats, this diameter being taken axially at a distance $P_{mini}$ from the planes of reference P of the width of said wheel, then the ratio $$R = \frac{Ø_c - Ø_g}{Ø_s - Ø_g}$$

must be greater than or equal to 0.65.

8 Claims, 6 Drawing Sheets

UTILITY VEHICLE WHEEL WITH VALVE EMERGING ON THE OUTSIDE OF THE DISK

BACKGROUND OF THE INVENTION

The invention relates to utility vehicle sheet metal wheels equipped with valves for inflating the tires, particularly those equipped with rims with a circumferential mounting groove in which the valve hole lies in the bottom or in the flank of the groove.

Figure 1:
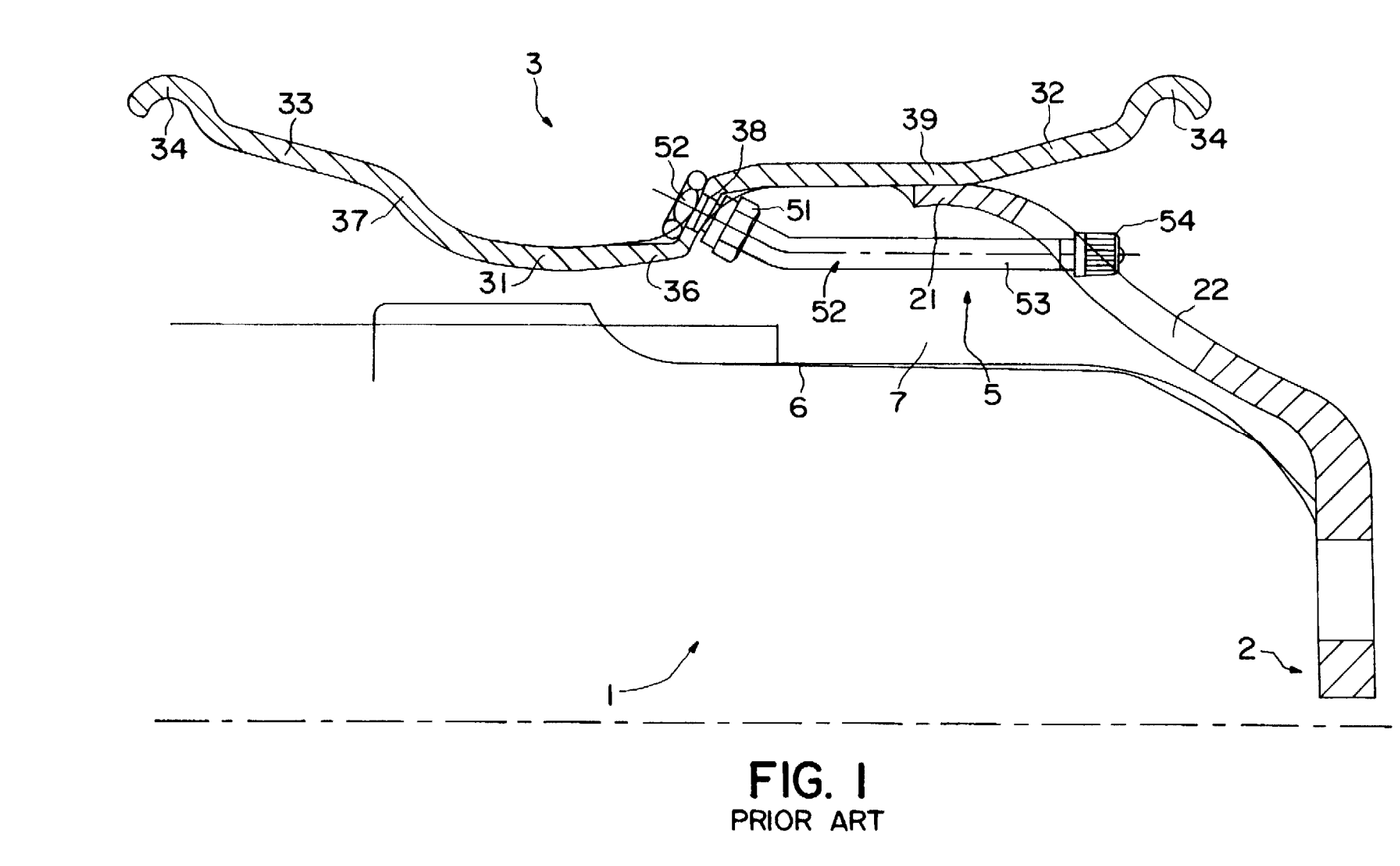
FIG. 1 shows an axial section passing through the valve hole of a conventional wheel.

Wheels of this type, an example is given in FIG. 1, are generally made by welding together a disk and a rim, the connecting region preferably being situated between one of the bead seats and the corresponding flank of the groove. Such wheels are equipped with a valve, the stem of which runs substantially alongside the radially interior wall of the rim (opposite the tire chamber), so as to extend to the outside of the vehicle, passing through an opening in the wheel disk, to make the threaded end and its cap accessible. In such an arrangement, the valve stem projects somewhat into the region between the rim and the axle where the braking components are housed.

Tires sometimes deflate inopportunely due to valve breakages. Running tests performed with wheels fitted with tubeless tires and mounted on vehicles running along stony tracks demonstrate the possibility that foreign bodies, such as stones, will penetrate the cavities between the rim, the hub and the braking components. With axles fitted with disk brakes, there is the possibility of foreign bodies getting between the bottom of the rim and the brake disk, and these foreign bodies which are driven around in rotation in these cavities may become jammed between parts which project into these cavities, particularly between the valve stem which rotates with the wheel and the brake mounting which is stationary, or between the latter and the rim because of the irregularity of the shapes of the objects driven around revolving on themselves. The passage of foreign bodies into these cavities is made all the easier by the gap between the rim and the brake disk. Mechanical impacts caused by these foreign bodies jammed between moving and stationary parts are then observed. These impacts may be severe enough to break metal parts such as the valve stems or to damage the rim or the parts making up the brake mounting, and the braking system in general. This leads to critical situations whether this be through a loss of braking or through sudden blow-out, and to maintenance problems.

A first solution to this problem is given by Patent Application FR9412263 which discloses a device for protecting the valve which at least partially radially envelops the surface of revolution generated by the rotation of the valve about the axis of the wheel.

However, this effective device requires an element to be added to the wheels/valves/tires assemblies and increases the cost of equipping and of maintaining the vehicles.

Another solution consists in locating the valve hole so that the valve stem is placed outside of the cavity defined by the rim, the wheel disk and the braking components. This means that the valve hole emerges axially on the outside of the wheel disk. Such arrangements for the valve hole are conventional for passenger car wheels or for some wheels cast in alloy for utility vehicles but have not yet been adapted to sheet metal wheels. However, it has been observed that adapting the foregoing solution to sheet metal wheels for utility vehicles may lead to a considerable diminishing of the fatigue strength of the wheels obtained.

Wheels of utility vehicles are understood to mean wheels with a diameter greater than or equal to 17.5 inches (444.5 mm). Indeed, for these wheels the service stresses prevent use of the conventional profiles of passenger-car wheels.

SUMMARY OF THE INVENTION

The subject of the invention is a wheel with sufficient fatigue strength for a utility vehicle, made of sheet metal and in a single piece, comprising a disk, a rim with a circumferential mounting groove between two bead seats and two flanges, the connection between said disk and said rim being made in a connecting region situated between the flank of the groove and the end of the seat which lie axially on the disk side, and a valve passing through said rim via a valve hole, is characterized in that said valve hole lies axially between said connecting region and said end of the seat which seat lies on the disk side, and in that if $Ø_g$ is the diameter of the radially interior surface of the mounting groove, $Ø_c$ is the diameter of the radially interior surface of the disk/rim connecting region, this diameter being taken axially at the end of the disk of the wheel, and $Ø_s$ is the diameter of the radially interior surface of the bead seats, this diameter being taken axially at a distance $P_{mini}$ from the planes of reference P of the width of said wheel, then the ratio $$R = \frac{Ø_c - Ø_g}{Ø_s - Ø_g}$$

must be greater than or equal to 0.65.

Advantageously, this ratio R may be greater than or equal to 0.75.

The attachment region may preferably be cylindrical, this making the connection easier to achieve in practice.

DESCRIPTION OF DRAWINGS

Several embodiments of the invention are now described without implied limitation, with the aid of the following appended drawings.

DESCRIPTION OF PREFERRED EMBODIMENTS

FIG. 1 shows a section through a conventional sheet metal wheel 1 in accordance with the ETRTO recommendations.

This wheel 1 for utility vehicle, made of sheet steel and as a single piece, is composed of a disk 2, a rim 3 and a valve 5. The rim comprises a central mounting groove 31, two bead seats, one 32 on the disk side and one 33 on the opposite side, and two flanges 34. The groove 31 is connected to the seat 33 on the opposite side to the disk 2 by a flank 37 and, on the disk 2 side, by a flank 36 followed by a region 39 for connection between the rim 3 and the disk 2. This connection is achieved by welding the end of the disk 2 to the radially interior wall of the connecting region 39. The valve hole 38 lies in the groove flank 36 on the disk 2 side. As a consequence, the valve stem 53 lies inside the disk 2 of the wheel and passes through the disk 2 via the opening 22.

This figure also shows the outline of the braking components 6 of the vehicle. It is observed that the cavity 7 between the rim 3, the disk 2 and the brake components 6 is relatively small, which demonstrates the vulnerability of the valve 5 when objects such as stones enter it.

Figure 2:
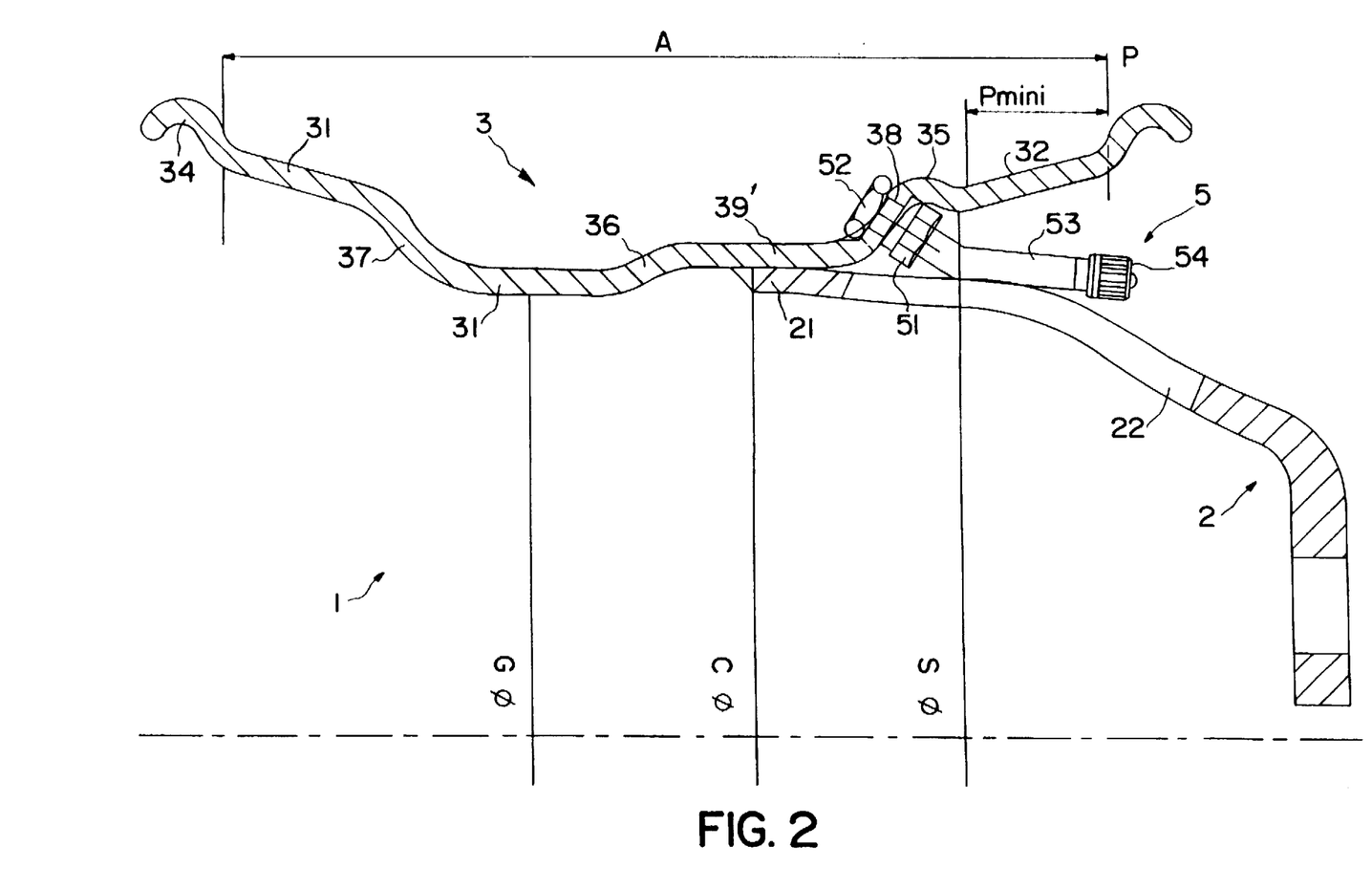
FIG. 2 is a similar section of an embodiment of a nonconventional wheel with a valve on the outside of the disk and a ratio less than 0.65, which is not satisfactory.

FIG. 2 shows a section through a nonconventional wheel with a valve hole 38 lying between the disk side bead seat 32 and the disk/rim connecting region 39'. The valve of this wheel cannot be damaged by objects getting into the cavity 7. By contrast, the fatigue strength of this wheel is notoriously insufficient.

Figure 3:
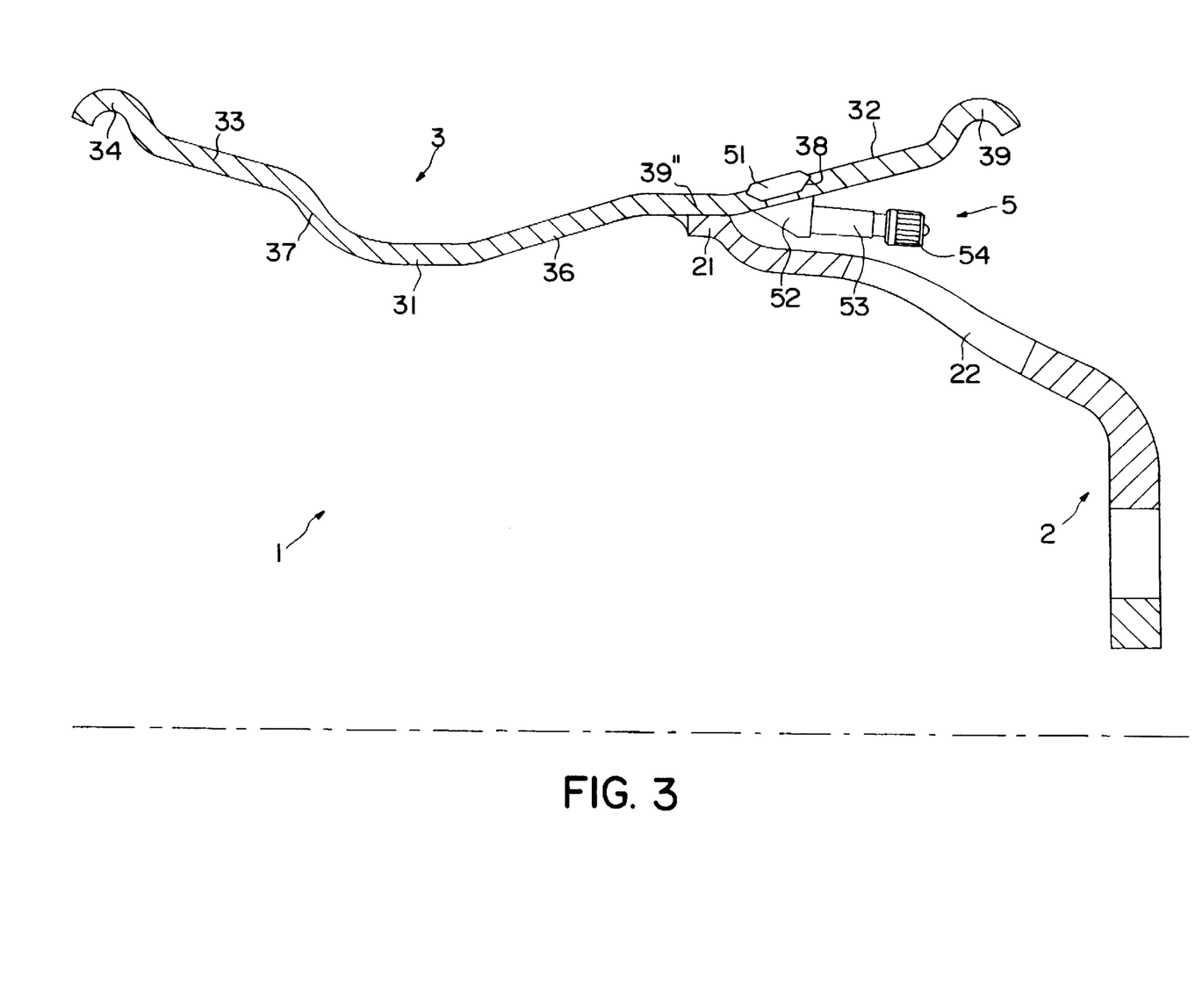
FIG. 3 is a similar section of a first embodiment of a wheel corresponding to the invention.
Figure 4:
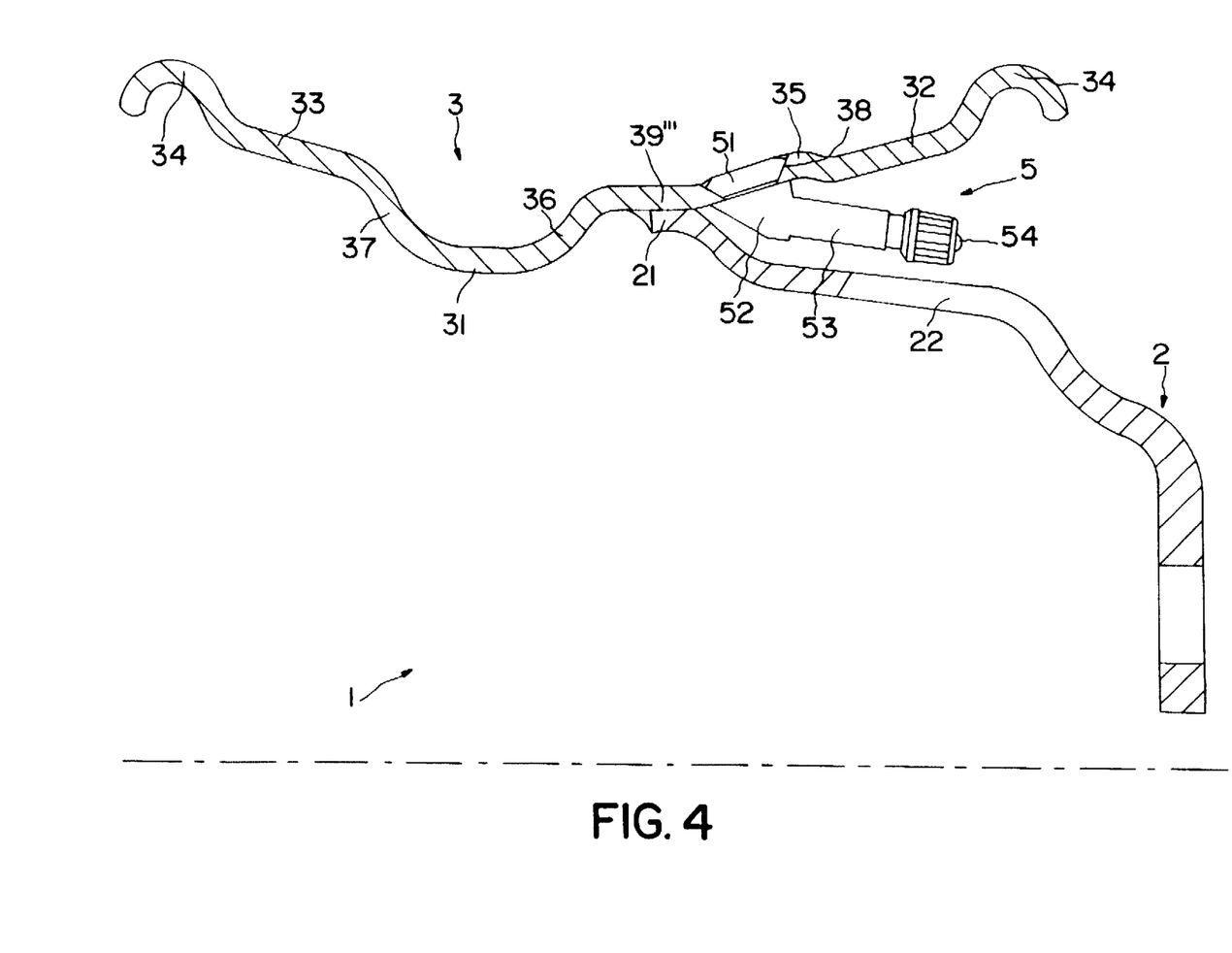
FIG. 4 is a similar section of a second embodiment of a wheel corresponding to the invention.
Figure 5:
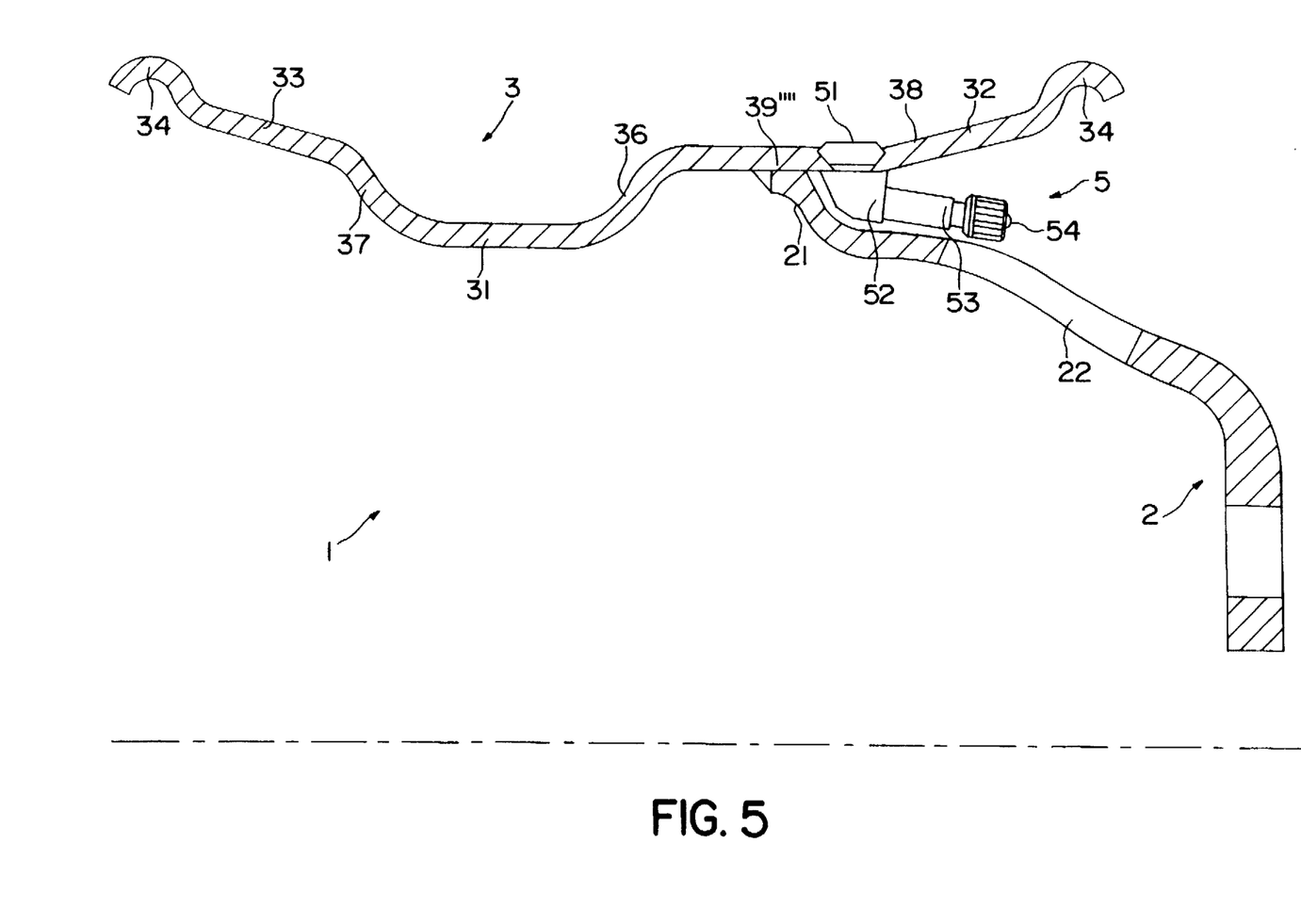
FIG. 5 is a similar section of a third embodiment of a wheel corresponding to the invention.

FIGS. 3, 4 and 5 show sections through wheels similar to the previous wheel but corresponding to the invention.

Let:

$\emptyset_g$ be the diameter of the radially interior surface of the mounting groove 31, $\emptyset_c$ be the diameter of the radially interior surface of the disk/rim connecting region 39, this diameter being taken axially at the end of the wheel disk 2, and $\emptyset_s$ be the diameter of the radially interior surface of the disk side bead seat 32, the diameter being taken axially at a distance $P_{mini}$ from the plane of reference P of this side of the wheel 1. The plane of reference P is defined, on each side of the rim 3, by the ETRTO recommendations, and the distance between these two planes on each side of the mounting groove corresponds to the width A of the wheel 1, for example here: 9.00 inches (228.6 mm) (see FIG. 2). Likewise, the distance $P_{mini}$ is also identified by these recommendations.

It has been discovered, quite surprisingly, that the value of the ratio $$R = \frac{\emptyset_c - \emptyset_g}{\emptyset_s - \emptyset_g}$$

was critical for the fatigue strength of wheels having a valve offset relative to the disk 2, as shown in FIGS. 2 to 5.

The following table shows the values of the parameters $\emptyset_g$, $\emptyset_s$, $\emptyset_c$, and R for a series of wheels tested together with their life in a fatigue test.

The fatigue test consists in running a road wheel/tire set on a flywheel running straight, at low speed (of the order of 40 km/hour) but under heavy overloads and in recording, for each load value applied, the life (in number of cycles) of the wheel.

Figure 6:
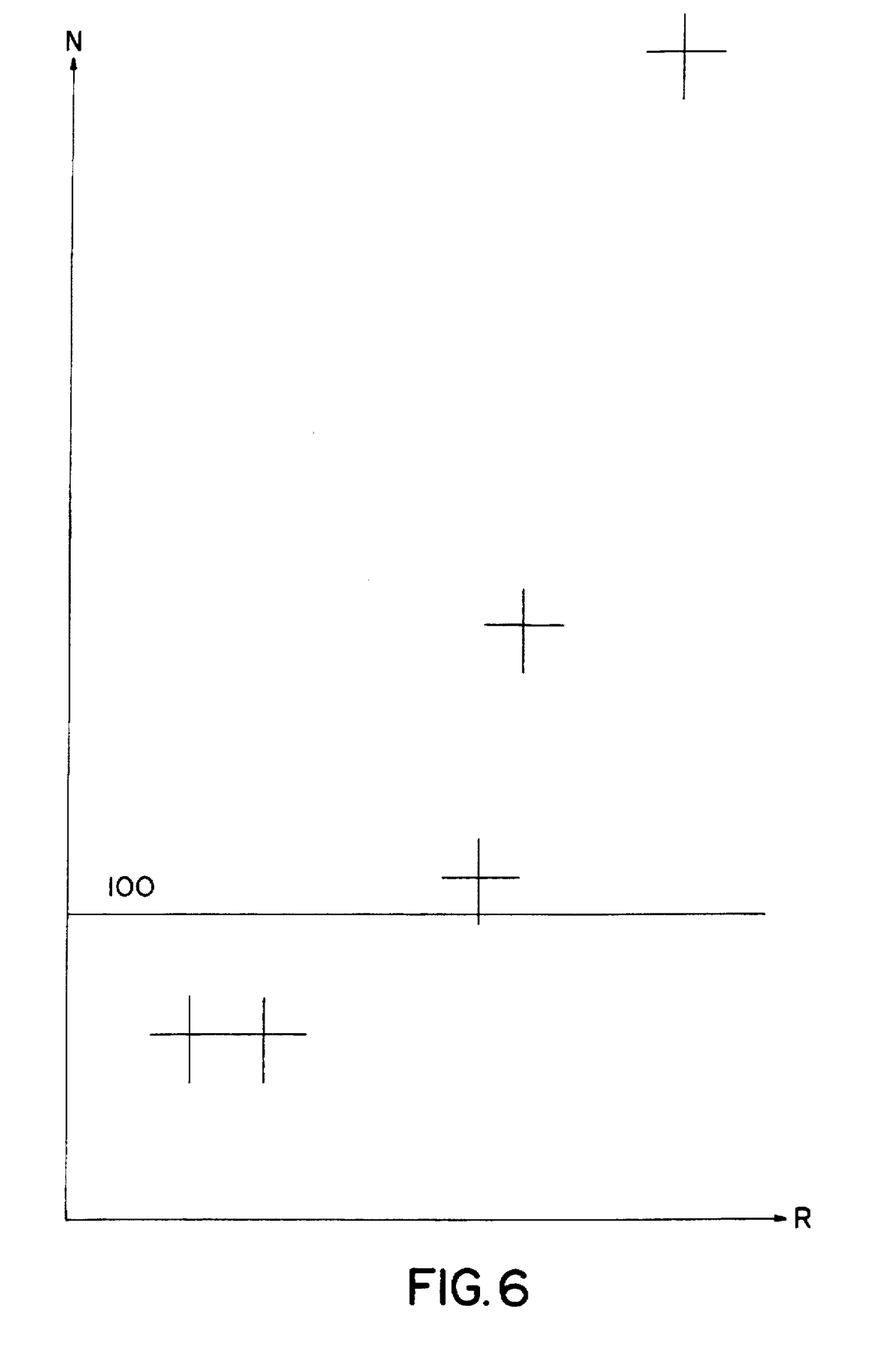
FIG. 6 is a graph showing the fatigue results obtained.

The results are expressed by a graph with $\log_{10} N$ along the x-axis, N being the number of cycles, and Q, the load applied, as the y-axis. A reference straight line Δ splits the graph into two fields I and II. When the life values lie to the right of this straight line, that is to say in region I, the fatigue strength of the wheel 1 is considered to be acceptable. For a given load, the acceptability limit is given by a corresponding number-of-cycles value.

The five wheels tested have dimensions 17.5 ×6.00 inches (wheels A and D) or 22.5 ×9.00 inches (wheels B, C and E). Wheels A and B correspond to the profile of FIG. 2, wheel C to the profile of FIG. 3, wheel D to the profile of FIG. 4, and wheel E to the profile of FIG. 5. Their ratios R range from 0.21 to 1.00 and FIG. 6 shows that the mean life obtained for these wheels varies very markedly as a function of this ratio R.

The normed life consists in taking as a base 100, the value of the minimum life for the wheel to be considered to be acceptable at the load applied during the fatigue test. Here, the base 100 corresponds to 0.5 $10^6$ cycles.

The wheels C, D and E with ratios R equal to 0.75, 0.68 and 1.00 have a satisfactory life. Wheels A and B have a very insufficient fatigue strength and ratios R equal to 0.21 and 0.33.

The FIG. 6 graph shows the results of the fatigue tests for the wheels shown, with the ratio R on the x-axis and the value of normed life on the y-axis. This graph shows that an R-value of 0.65 is a minimum value for obtaining sufficient fatigue strength.

Of course, the value of this ratio is by no means the only parameter to influence the fatigue strength, the thickness of the sheet metals of the disk 2 and of the rim 3, the presence and geometry of the openings 22 in the disk 2, the geometry of the disk 2, . . . are also all very important factors. However, after having optimized these various factors, to obtain a satisfactory life result while maintaining acceptable total weight, it is necessary to optimize the profile of the wheel in such a way that the ratio R is greater than 0.65 and is preferably greater than 0.75.

The ratio R means that it is very important to keep the greatest possible difference between the radial height between the mounting groove and the rim/disk connecting region. Of course, it is even desirable to keep the rim/disk connecting region at the same radial height as the bead seat, this is what was achieved for the wheel E, but this is not possible for all rim widths, especially 6.00 inches (152.4 mm). Upward of 9.00 inches (228.6 mm) the rim is wide enough for it to be easier to obtain a high ratio for R.

In order to obtain an acceptable value for the ratios $$R = \frac{\emptyset_c - \emptyset_g}{\emptyset_s - \emptyset_g}$$

the rims 3 of FIGS. 3 and 4 have the length of their rim/disk connecting region 39" and 39"' reduced to a minimum and the region of the valve hole 38 lies in the extension of the disk side bead seat 32, without hump (FIG. 3) or with a slight offset due to a small hump 35 (FIG. 4). Any other retaining device may also be used. In the profile of FIG. 3, the region of the valve hole 38 lies in the extension of the disk side bead seat 32 with the same angle of inclination relative to the axis of the wheel.

| Wheel | Dimensions (inches/mm) | $\emptyset_3$ (mm) | $\emptyset_c$ (mm) | $\emptyset_g$ (mm) | R | L ($10^6$ cycles) | LN normed |
|---|---|---|---|---|---|---|---|
| A | 17.5 × 6.00 (444.5 × 152.4) | 421 | 390 | 382 | 0.21 | 0.3 | 60 |
| B | 22.5 × 9.00 (571.5 × 228.6) | 538.4 | 510 | 496 | 0.33 | 0.3 | 60 |
| C | 22.5 × 9.00 (571.5 × 228.6) | 538.4 | 527.7 | 496 | 0.75 | 0.97 | 194 |
| D | 17.5 × 6.00 (444.5 × 152.4) | 421 | 408.4 | 382 | 0.68 | 0.56 | 112 |
| E | 22.5 × 9.00 (571.5 × 228.6) | 538.4 | 538.4 | 496 | 1.00 | 1.90 | 380 |

It is essential not to reduce the size of the mounting groove 31 in order to allow the tires to be fitted.

In the case of the wheel shown in FIG. 5, it has also been possible to keep the same radial height for the disk/rim connecting region 39"" and the valve hole 38. This makes it possible to have a ratio R equal to 1 and the fatigue life level is particularly good. This was achieved without reducing the size of the mounting groove 31 thanks to the use of a valve of optimized dimensions.

As a preference, as represented in FIGS. 3 and 4, the valve 5 used is of small size and has a nut 51 at least partially sunk into the thickness of the rim.

That makes it easier to fit and remove the tires.

The wheels according to the invention can be made of steel sheet or aluminum sheet in particular.

I claim:

1. A wheel (1) for a utility vehicle, made in a single piece of sheet metal, comprising a disk (2), a rim (3) with a circumferential mounting groove (31) between two bead seats (32, 33) and two flanges (34), a connection between said disk (2) and said rim (3) being made in a connecting region (39",39"',39"") situated between the flank (36) of the groove (31) and the end of the seat (32) which lie axially on the disk (2) side, and a valve (5) passing through said rim (3) via a valve hole (38), characterized in that said valve hole (38) lies axially between said connecting region and said end of the seat (32) which lies on the disk (2) side, and in that if $\emptyset_g$ is the diameter of the radially interior surface of the mounting groove (31), $\emptyset_c$ is the diameter of the radially interior surface of the connecting region, this diameter being taken axially at the end of the disk (2) of the wheel (1), and $\emptyset_s$ is the diameter of the radially interior surface of the bead seats (32, 33), this diameter being taken axially at a distance $P_{mini}$ from the planes of reference P of the width of said wheel (1), then the ratio $$R = \frac{\emptyset_c - \emptyset_g}{\emptyset_s - \emptyset_g}$$

is greater than or equal to 0.65.

2. A wheel according to claim 1, such that the ratio $$R = \frac{\emptyset_c - \emptyset_g}{\emptyset_s - \emptyset_g}$$

is greater than or equal to 0.756.

3. A wheel according to claim 1, such that the region (39) for connection between the disk (2) and the rim (3) is a cylindrical region.

4. A wheel according to claim 1, including a nut (51) for fastening the valve (5) which nut is at least partially recessed within the thickness of the rim (3).

5. A wheel according to claim 1, in which a region including a valve hole (38) lies in an extension of the bead seat (32) on the disk (2) side with the same angle of inclination relative to the axis of the wheel.

6. A wheel according to claim 1, in which a region including a valve hole (38) lies in an extension of the disk/rim connecting region on the disk (2) side, at the same radial height.

7. A wheel according to claim 1, in which a region of the valve hole (38) is connected to the bead seat (32) on the disk (2) side by a retaining device such as a hump (35).

8. A wheel according to claim 1, in which the width of said wheel (1) is between 6.00 inches (152.4 mm) and 9.00 inches (228.6 mm).

* * * * *

UNITED STATES PATENT AND TRADEMARK OFFICE
CERTIFICATE OF CORRECTION

PATENT NO. : 5,788,334

DATED : August 4, 1998

INVENTOR(S) : Etienne Renard

It is certified that error appears in the above-identified patent and that said Letters Patent is hereby corrected as shown below:

Col. 3, first line of table, after "dimensions", "$ø_3$ " should read --$ø_s$--;

Col. 4, line 45, "39″ and 39‴" should read --39″ and 39⁗--;

Col. 6, line 12, "0.756 " should read --0.75--.

Signed and Sealed this

Eighth Day of June, 1999

Attest:

Q. TODD DICKINSON

*Attesting Officer*     *Acting Commissioner of Patents and Trademarks*